United States Patent
Eichinger et al.

(10) Patent No.: US 7,773,635 B2
(45) Date of Patent: Aug. 10, 2010

(54) METHOD, NETWORK DEVICE AND USER STATION FOR ALLOCATING RESOURCES TO FREQUENCY BANDS OF RADIO COMMUNICATION SYSTEM

(75) Inventors: Josef Martin Eichinger, Neufinsing (DE); Matthias Lott, Neuried (DE); Egon Schulz, Wittenberger (DE); Wolfgang Zirwas, Groebenzell (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 654 days.

(21) Appl. No.: 11/611,739

(22) Filed: Dec. 15, 2006

(65) Prior Publication Data
US 2007/0140166 A1    Jun. 21, 2007

(30) Foreign Application Priority Data
Dec. 15, 2005    (EP)    .................................. 05027545

(51) Int. Cl.
*H04J 4/00*    (2006.01)
(52) U.S. Cl. .................. 370/478; 370/436; 370/337; 370/344; 455/450; 455/451
(58) Field of Classification Search .................. 370/280, 370/276, 281, 294, 295, 478; 455/451, 450
See application file for complete search history.

(56) References Cited

U.S. PATENT DOCUMENTS

| | | | |
|---|---|---|---|
| 6,031,827 A * | 2/2000 | Rikkinen et al. | 370/330 |
| 7,177,598 B2 * | 2/2007 | Klein et al. | 455/63.1 |
| 2004/0171385 A1 * | 9/2004 | Haustein et al. | 455/450 |
| 2004/0252659 A1 * | 12/2004 | Yun et al. | 370/328 |

FOREIGN PATENT DOCUMENTS

| | | |
|---|---|---|
| DE | 199 01 422 A1 | 8/2000 |
| EP | 1 259 092 A2 | 11/2002 |
| GB | 2 398 455 A1 | 8/2004 |

OTHER PUBLICATIONS

Xin Wang, Ramachandran Ramjee, Harish Viswanathan, "Adaptive and Predictive Downlink Resource Management in Next Generation CDMA Networks", IEEE, 2004.*
Search Report for European Patent Application No. 05 02 7545; completed May 8, 2006.

* cited by examiner

*Primary Examiner*—Huy D Vu
*Assistant Examiner*—Omer Mian
(74) *Attorney, Agent, or Firm*—Staas & Halsey LLP

(57) ABSTRACT

Resources of two frequency division duplex (FDD) frequency bands at a distance from each other are allocated for transmissions by a time division duplex (TDD) transmission method. The resources in the first FDD frequency band are allocated for FDD transmissions in the uplink and for TDD transmissions predominantly in the uplink as the primary transmission direction, and in a secondary manner in the downlink as the secondary transmission direction. The resources in the second FDD frequency band are allocated for FDD transmissions in the downlink and for TDD transmissions predominantly in the downlink as the primary transmission direction and in a secondary manner in the uplink as the secondary transmission direction. No resources are allocated for time periods of an allocation of resources for one of the secondary transmission directions in the first and second frequency bands, for FDD transmissions in the counter transmission direction to this secondary transmission direction.

39 Claims, 4 Drawing Sheets

METHOD, NETWORK DEVICE AND USER STATION FOR ALLOCATING RESOURCES TO FREQUENCY BANDS OF RADIO COMMUNICATION SYSTEM

CROSS REFERENCE TO RELATED APPLICATIONS

This application is based on and hereby claims priority to European Application No. EP05027545 filed on Dec. 15, 2005, the contents of which are hereby incorporated by reference.

BACKGROUND

Described below is a method for allocating resources to frequency bands of a radio communication system as well as a corresponding network device and user station.

Future mobile radio communication systems are intended to allow both short-range and long-range transmissions between a central base station and mobile stations. For the short range it is advantage to use what is known as time division duplex (TDD), as this procedure allows channel estimation in the downlink DL from transmissions in the uplink UL due to the reciprocity of the radio channel. This is an important feature for example for what are known as MIMO systems (MIMO: Multiple Input Multiple Output Antennas) with spatial multiplexing or for what are known as multi-hop networks.

As spatial multiplexing SMUX requires channel estimation with a high level of accuracy and signal to noise ratios higher than around 11 dB, spatial multiplexing is currently considered to be a typical short-range technology for transmissions up to around 200 m. If TDD is used together with spatial multiplexing in a limited number of hotspots, spatial separation between different hotspots prevents the generally known interference between base stations, which is seen as a major disadvantage of TDD.

For cellular long-range systems frequency division duplex (FDD) is preferred due to its clearly defined interference conditions. FDD can be used as full duplex with a diplexer filter (diplexer/antenna separator filter) to separate transmissions in the downlink and uplink. Alternatively FDD can be used as half duplex, with each mobile station either only sending or only receiving in a respective time slot, such that a switch together with a fast-control local oscillator can replace the diplexer. Instead of a fast-control oscillator it is also possible with half-duplex FDD to switch between the lower and upper frequency band or sideband. This allows more economical oscillator solutions.

Proposals for converting TDD, FDD and half-duplex FDD as well as possible combinations thereof are the subject of general discussion.

GB 2 398 455 A describes TDD operation in an FDD band. The available resources of a first of two FDD frequency bands are thereby divided into time slots and allocated symmetrically for TDD uplinks and TDD downlinks. The FDD frequency band is a frequency band generally used as an FDD uplink frequency band. The assigned duplex frequency band, in other words an FDD downlink frequency band, is also used as required expressly only for TDD downlinks to prevent interference. With this procedure therefore TDD transmissions are implemented instead of FDD transmissions in a duplex-FDD frequency band.

SUMMARY

An aspect of the invention is to configure a method more effectively for allocating resources to frequency bands of a radio communication system with a view to more efficient system utilization and with a view to the possibility of allocating resources to stations in the short range or stations in the long range. It is thereby intended to prevent typical poor interference conditions between base stations or network access stations for example, as known from TDD, while maintaining a large degree of flexibility in respect of transmission asymmetry. In particular it should be simple to allow the otherwise difficult to manage coordination of frequency band utilization between base stations at one location but associated with different operators with little synchronization outlay.

Accordingly a method for allocating resources to frequency bands of a radio communication system is preferred, wherein resources of a first and second of two FDD frequency bands at a distance from each other are allocated for transmissions by a TDD transmission method, with the resources in the first FDD frequency band being allocated for FDD transmissions in the uplink and for TDD transmissions predominantly in the uplink as the primary transmission direction and in a secondary manner in the downlink as the secondary transmission direction, with the resources in the second FDD frequency band being allocated for FDD transmissions in the downlink and for TDD transmissions predominantly in the downlink as the primary transmission direction and in a secondary manner in the uplink as the secondary transmission direction and, for periods of an allocation of resources for one of the secondary transmission directions in the first and second frequency bands, with no resources being allocated for FDD transmissions in the counter transmission direction to this secondary transmission direction.

During the periods of allocation of resources for one of the secondary transmission directions only resources for TDD transmissions are preferably allocated in the first and second frequency bands.

A method is particularly advantageous, wherein such allocation of resources for the secondary transmission direction preferably takes place in a synchronized manner taking into account all frequency sub-bands of the first and second frequency bands. A method is expedient, wherein frequency sub-bands of different base stations with overlapping transmit ranges and with independent resource allocation are operated by their operators in a synchronized manner in respect of each other with regard to the allocation of resources for the secondary transmission directions.

For TDD transmissions in the secondary transmission direction only up to 20%, in particular up to 10% of resources are allocated in temporal succession, compared with TDD transmissions in the counter primary transmission direction. This is particularly advantageous, where transmissions can be implemented in the secondary direction for a frequency in the other frequency band.

One frequency sub-band of the first and second frequency bands respectively can advantageously be allocated as an FDD control channel. During a temporally simultaneous allocation of further frequency sub-bands the control channel is then either advantageously left unused as an idle gap or allocated for a TDD transmission for the secondary TDD transmission direction.

Resources for TDD transmissions in the primary transmission direction can be allocated in the respective frequency band for some frequency sub-bands and further of the frequency sub-bands can be allocated for FDD transmissions in the same transmission direction within the frequency band in each instance.

Resources of a frequency guard band between the first and second frequency bands can be allocated temporarily as additional frequency sub-bands for TDD transmissions, allowing very simple and flexible adaptation to current traffic loads. In this context it is advantageously also possible that further to displacement of the frequency guard band between the first and second frequency bands fewer frequency sub-bands are allocated temporarily to the first frequency band than to the second frequency band.

Within one time segment a time sub-segment can be allocated for FDD transmissions, a time sub-segment can be allocated for TDD transmissions in the primary transmission direction and a time sub-segment can be allocated for TDD transmissions in the secondary transmission direction, similarly allowing variable adjustment to current load conditions.

In the case of FDD transmissions resources are expediently allocated for half-duplex FDD transmissions.

The user station and network device respectively have all the features required to implement the method. In particular corresponding means can be provided respectively to implement the operations of the method or variants thereof.

The basic concept is therefore that of combining two frequency bands as two more or less coupled TDD frequency bands, with the frequency bands not only being used purely as TDD frequency bands but also in combination as half-duplex FDD frequency bands, in particular for long-range transmissions. A first of the frequency bands is hereby used predominantly for downlink transmissions and a second of the frequency bands is used predominantly for uplink transmissions. The first frequency band can hereby have lower frequencies than the second frequency band and vice-versa. One particular feature is that one of the two frequency bands is used for solely FDD transmissions in the downlink, for predominantly TDD transmissions in the downlink and only in a secondary manner for TDD transmissions in the uplink, while the other of the frequency bands is used conversely only for FDD transmissions in the uplink, predominantly for TDD transmissions in the uplink and only in a secondary manner for TDD transmissions in the downlink. In one frequency band the ratio of TDD transmissions in the uplink and downlink is preferably such that for example 90% of the time is taken up with TDD transmissions in the same direction, in which FDD transmissions take place in the frequency band for example according to a half-duplex system, while TDD transmissions take place only for approximately 10% of the time in the counter direction.

It is therefore possible to support both symmetrical and asymmetrical traffic, with only the half-duplex frequency band being changed. Typical unfavorable interference conditions, in other words transmissions in the uplink and downlink in the same time period (e.g. one or more time slots) can be prevented completely by inserting an idle gap for FDD transmission during periods, in which a secondary TDD transmission is provided for in one time segment. In other words there is no FDD transmission in these time periods of a time segment (e.g. a transmission frame). This is possible if the base stations are synchronized. The duration of an idle gap, which is short compared with the duration of a time segment, allows the overall loss of the FDD transmission in one time segment to be limited to a very small value, for example less than 10%.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
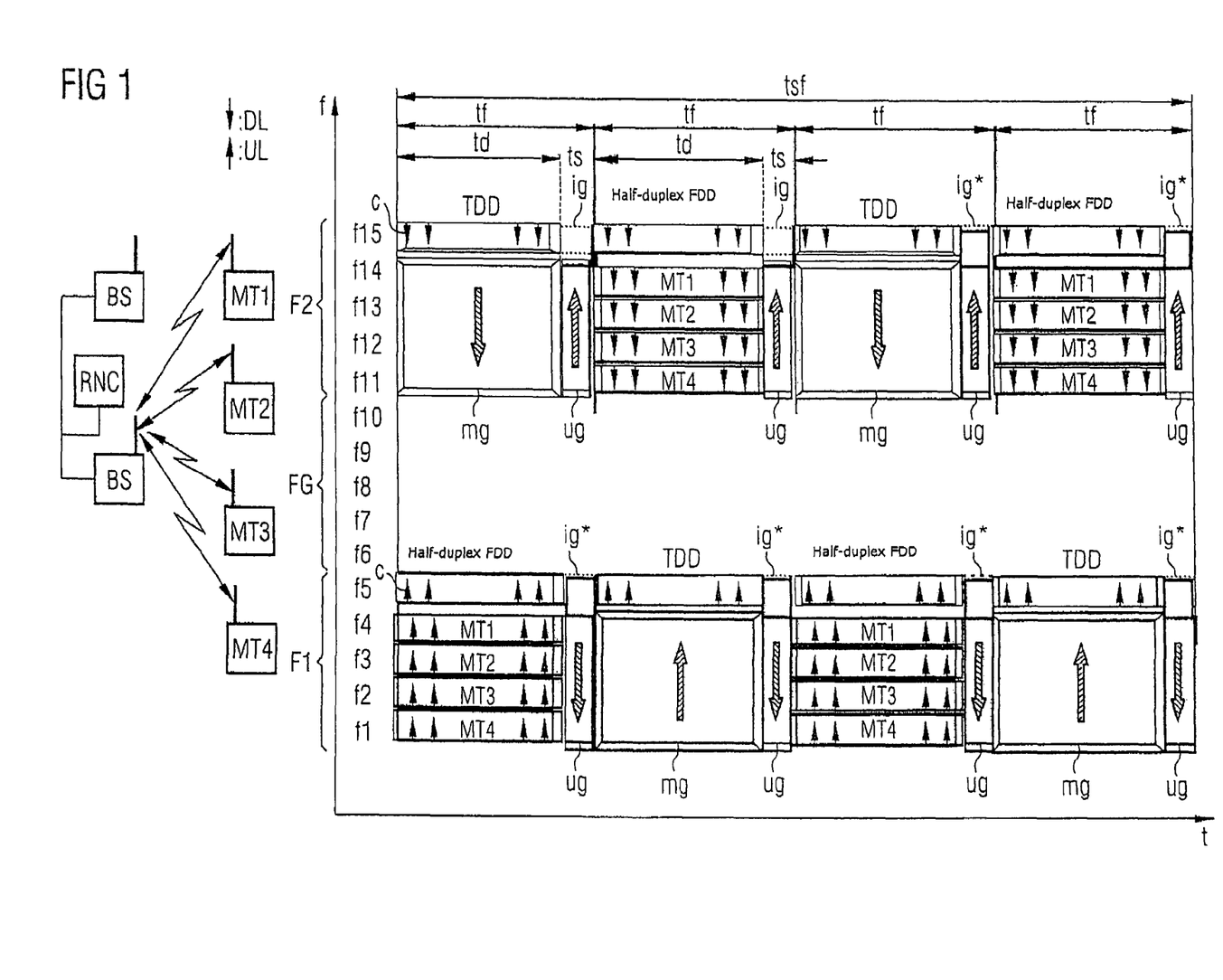
FIG. 1 is a block system and data diagram for an example of a base station with radio connections to mobile stations and an allocation system for resources to available frequency bands of a radio communication system and FIGS. 2 and 3 are block system and data diagrams of alternative allocation systems to allocate resources to frequency bands of a radio communication system according to FIG. 1.

FIG. 1 shows the situation of two exemplary base stations BS, which are connected by way of a control facility RNC as a network device to allocate radio resources and/or to coordinate resources to frequency bands of a radio communication system. Optionally the two base stations BS can thereby be assigned to different operators, which carry out synchronization directly by way of such an intermediately connected control facility RNC or by reciprocal synchronization based on signals received from the respective other base station BS. A base station BS here is not necessarily a base station of a specific radio communication system but in the wider sense an access facility for radio-based mobile stations. The base stations BS communicate by way of radio interfaces with stations MT1, MT2, MT3, MT4, which are generally also referred to as mobile radio devices or mobile terminals. For the mutual synchronization of a number of such base stations BS, it is not essential to have the control facility RNC to allocate radio resources or coordinate resources. It is also advantageously possible to synchronize base stations BS by way of the air, with one or more base stations BS for example carrying out the synchronization or coordination themselves.

A frequency range is available to the radio communication system or the base stations BS for communication with the mobile stations MT1, MT2, MT3, MT4, the frequency range being divided into a plurality of individual frequency bands F1, FG, F2 with frequency sub-bands f1, f2, . . . , f15. The individual frequency sub-bands f1, f2, . . . , f15 are therefore available as resources, which are allocated to different of the mobile stations MT1, MT2, MT3, MT4 on the frequency bands, it being possible to allocate the frequency sub-bands f1, f2, . . . , f15 of the available frequency range f to different ones of the mobile stations MT1, MT2, MT3, MT4 respectively as a function of the time t. Resources thus formed can also be allocated according to different transmission systems with permanent assignment of frequency sub-bands according to FDD or half-duplex FDD on the one hand or with the allocation of time slots according to TDD.

The mobile stations MT1, MT2, MT3, MT4 are for example designed for operation both by TDD and by FDD. In TDD operation they can also use resources both in the first frequency band and in the second frequency band. For example a mobile station can switch between the frequency bands F1, F2 both in FDD operation and in TDD operation from one time segment tf to the next. Longer or shorter times can of course also be provided for frequency switches between the frequency bands F1, F2.

The frequency sub-bands f1, f2, ..., f15 are for example what are known as sub-carriers, which are used for example for OFDM (Orthogonal Frequency Division Multiplexing) and/or OFDMA (Orthogonal Frequency Division Multiple Access).

Figure 2:
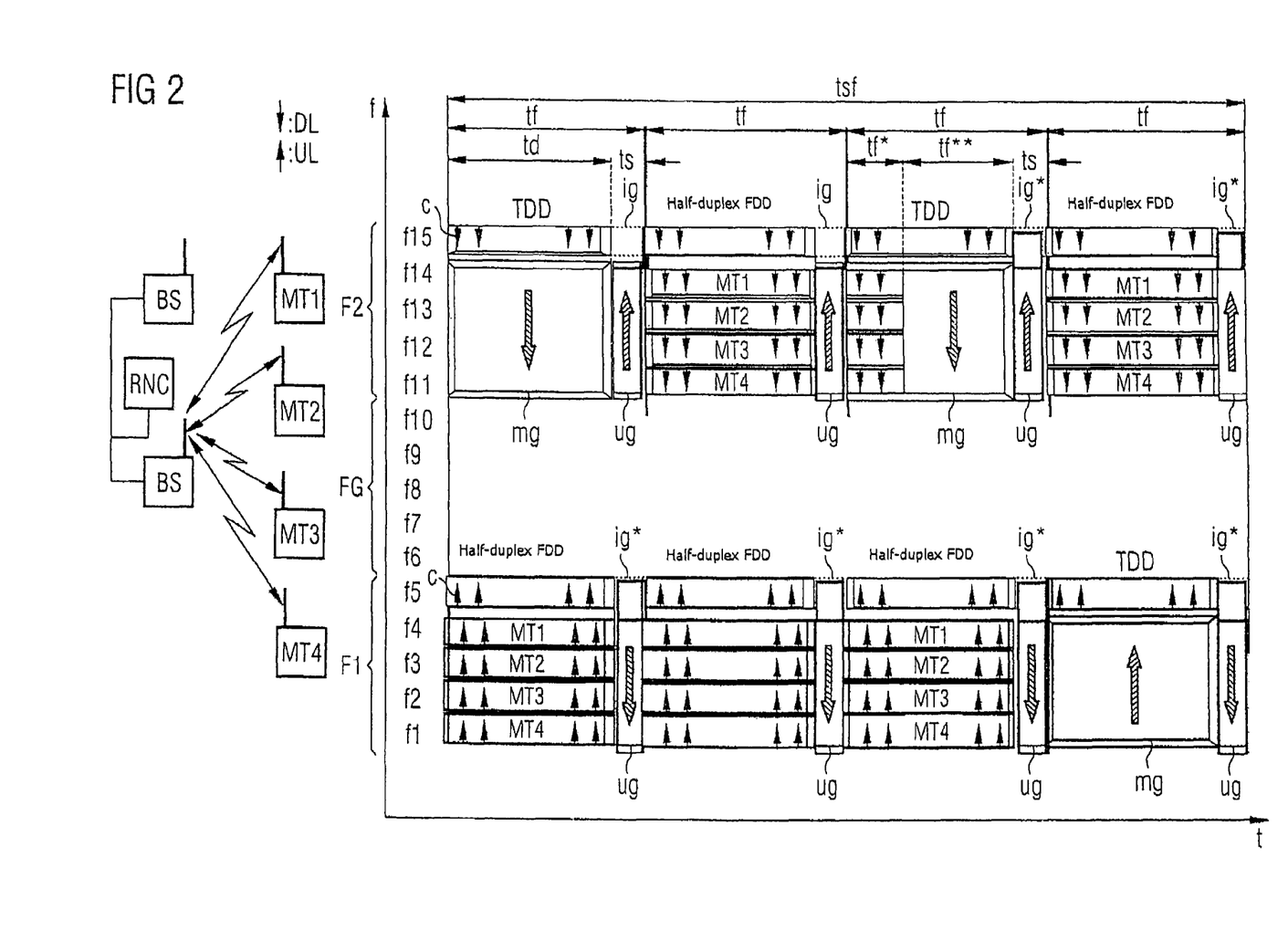
Figure 3:
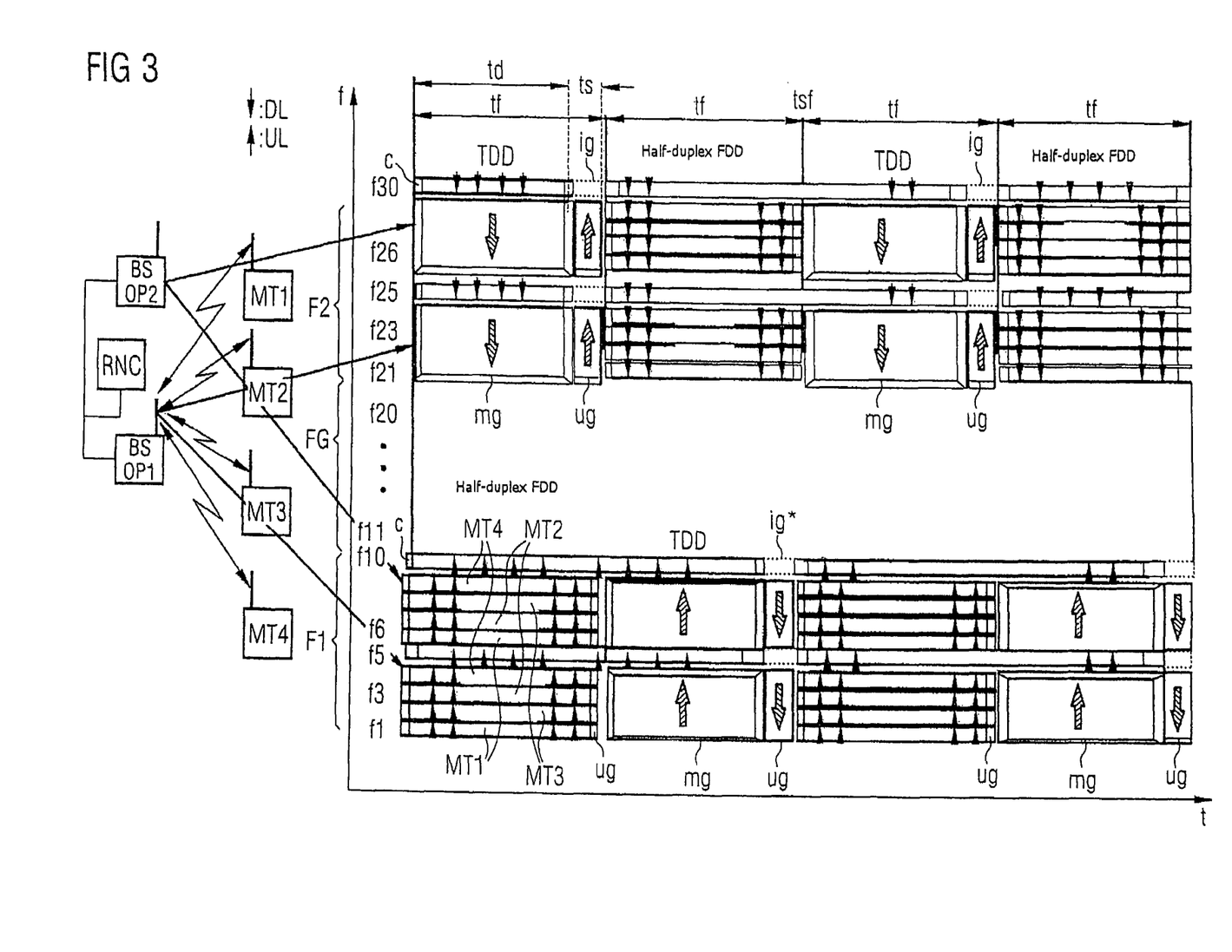
Figure 4:
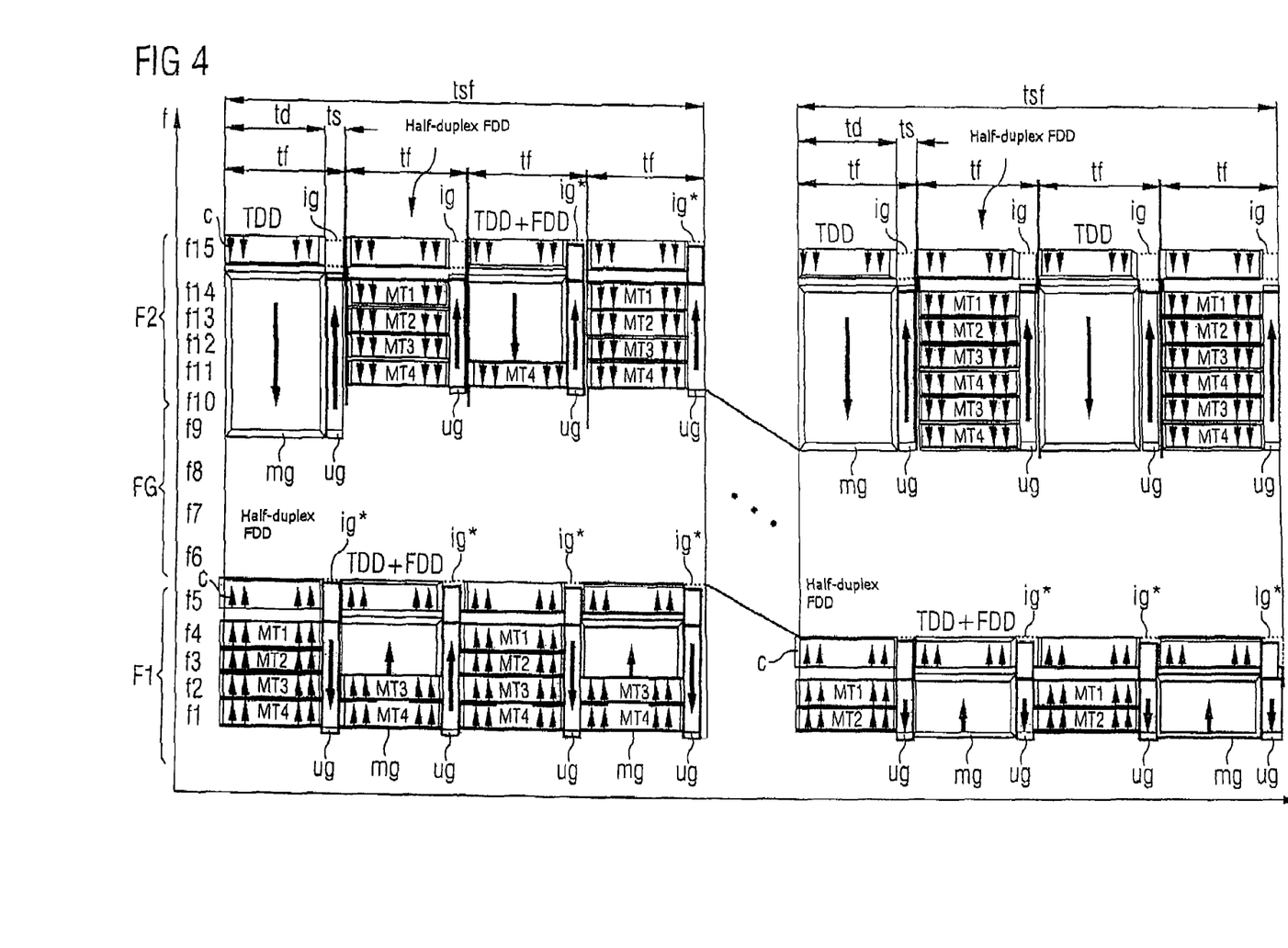
FIG. 4 is a data diagram of an alternative allocation systems to allocate resources to frequency bands of a radio communication system according to FIG. 1.

To illustrate the allocation of resources to the frequency bands F1, F2 or the frequency sub-bands f1, f2, ..., f15 for an exemplary consideration according to the diagram in FIG. 1 and the further FIGS. 2, 3 and 4, a primary time range is specified as a superframe tsf, which in turn is subdivided into individual time segments tf, known as transmission frames. Subdivision into three frequency bands F1, FG, F2 also takes place, with a first frequency band F1 with for example five frequency sub-bands f1, f2, f3, f4, f5 and a second frequency band F2 with for example a further five frequency sub-bands f11, f12, f13, f14, f15 being used, to allocate resources for transmission between the base station BS and the mobile stations MT1, MT2, MT3, MT4. In the manner known for FDD a frequency guard band FG is disposed between the first and second frequency bands F1, F2, in this exemplary embodiment having five further frequency sub-bands f6, f7, f8, f9, f10.

According to a basic division of the preferred method for allocating resources, the first frequency band F1 is allocated for transmissions in the uplink according to FDD or half-duplex FDD during some of the time segments tf of the superframe tsf, while during other of the time segments tf of the superframe tsf the first frequency band F1 is allocated for predominantly TDD transmissions in the uplink UL as the primary transmission direction mg for the first frequency band F1 and only in a secondary manner for TDD transmissions in the downlink DL as the secondary transmission direction ug for the first frequency band F1. Resources are allocated in a converse manner in the second frequency band F2, in that some of the time segments tf of the superframe tsf are used for half-duplex FDD transmissions in the downlink DL as the primary transmission direction mg for the second frequency band F2 and others of the time segments tf of the superframe tsf are used according to TDD predominantly for transmissions in the downlink DL and in a secondary manner for transmissions in the uplink UL as the secondary transmission direction ug for the second frequency band F2. The division between transmissions in the downlink DL and uplink UL according to TDD takes place in the respective time segments tf of the frequency bands F1, F2, such that preferably less than 20%, preferably 10% or less of the transmissions take place in the counter transmission direction compared with the FDD or half-duplex FDD transmissions of adjacent time segments tf of the same frequency band F1 or F2.

The two frequency bands F1, F2 are also preferably synchronized with each other such that during TDD transmissions in the secondary transmission direction ug in one of the frequency bands F1, F2 corresponding transmissions respectively are also implemented in the secondary transmission direction ug in the other of the frequency bands F1, F2.

The two frequency bands F1, F2 are preferably synchronized with each other in respect of the time segments tf.

System-wide synchronization of all the frequency sub-bands f1, f2, ..., f15 preferably takes place to the time periods ts or time intervals of the secondary transmission direction ug. A time period ts for example includes one or more time slots. Embodiments are particularly preferred, wherein a TDD transmission always takes place in only one of the two frequency bands F1, F2 in the primary transmission direction mg, with FDD or half-duplex FDD transmissions being implemented at the same time in the other of the two frequency bands F2, F1.

One of the two frequency sub-bands f5, f15 can preferably be used in each instance as the FDD control channel c to manage the allocation of resources and to manage synchronization. It is thereby optionally possible for either no transmission at all to be permitted on the FDD control channel c during transmissions in the secondary transmission direction ug, such that an idle gap ig results, or for the corresponding frequency sub-bands f5, f15 of the FDD control channel c to be allocated for TDD transmissions ig* in the secondary transmission direction in each instance.

During the allocation of resources therefore, with a view to TDD allocation, the time segments tf are subdivided into a first time sub-segment td for the primary transmission direction mg or main transmission direction and a time period ts for the secondary transmission direction ug.

With this basic concept two frequency bands F1, F2 are separated by a frequency guard band FG, as known from FDD. For the allocation of resources according to half-duplex FDD an FDMA component (FDMA: Frequency Division Multiple Access) can allow a number of stations MT1, MT2, MT3, MT4 or users to be scheduled in, by allocating them to different sub-carriers in the form of the frequency sub-bands f4, f3, f2, f1, f14, f13, f12, f11. One of the frequency sub-bands f5, f15 respectively can optionally be used as an FDD control channel c for FDD transmissions.

Over time t the frequency sub-bands f1, f2, f3, f4, f5, f11, f12, f13, f14, f15 respectively are commonly assigned data blocks by time slot or time segment, with the transmission direction predominantly in either the uplink only or the downlink only to prevent interference states within the frequency bands F1 and F2 for the data blocks that are respectively adjacent in respect of time and in respect of the frequency of the frequency sub-bands. Transmission in the counter direction only takes place for very short time periods ts with data blocks, which are allocated for TDD transmissions.

In known systems significant and difficult to manage interference states would occur in the secondary transmission direction ug, as transmissions would take place simultaneously in the same frequency band in the primary transmission direction of the frequency band. To counter this, the entire cellular system of the radio communication system is synchronized such that the secondary transmission direction ug is preferably synchronized to the short time periods ts shown by way of an example for all frequency sub-bands. Such synchronization means that all base stations or further stations assigned to these on the network side and of relevance for an allocation have precise knowledge of when such time periods ts with interference may occur, so that it is possible to avoid dividing up or allocating resources for use by the mobile stations MT1, MT2, MT3, MT4 in the primary transmission direction in these time periods ts. These time periods ts for the secondary transmission direction ug are used by the base stations themselves for TDD transmission, such that all TDD stations transmit in the same respective direction or otherwise would have to take into account a higher probability of collision.

For known TDD systems the switching point between transmissions in the downlink DL or uplink UL is located either in the center of a frame to achieve symmetry or away from the center to achieve asymmetrical traffic. This can make the capacity loss for the overall system very high, if only a few TDD stations are available. To avoid this disadvantage, the time periods ts for transmission in the counter direction, in other words for transmission in the secondary transmission direction ug, are set to a very low value compared with the duration or length of the time segments tf. Correspondingly the time period ts for the secondary transmission direction ug or transmissions counter to the main transmission direction, in other words counter to the primary transmission direction of the respective frequency band F1, F2, are preferably limited to only one or a few time slots per time segment tf. However this would result in very asymmetrical traffic for a known TDD system. According to the described exemplary embodiment the two frequency bands F1, F2 are therefore scheduled in a combined manner, such that TDD data transmissions in the uplink UL or in the downlink DL are preferably implemented by way of the corresponding uplink/downlink FDD frequency band. This means that a symmetrical traffic can be achieved when considered over both frequency bands F1, F2.

As an alternative or in addition to TDD operation, as shown in FIG. 1, it is also possible to assign an FDD frequency sub-band f4, f3, f2, f1 to the four mobile stations MT1, MT2, MT3, MT4 for transmissions in the uplink UL in each instance for half-duplex FDD during the first and third time segments tf in the uplink UL in the first frequency band F1. For transmissions in the downlink DL in contrast a frequency sub-band f14 f13, f12, f11 is assigned to the stations MT1, MT2, MT3, MT4 respectively during the second and fourth time segments tf in the downlink DL.

While for TDD between the uplink UL and the downlink DL it is necessary to switch between transmitter and receiver, for half-duplex FDD it is also necessary to switch by at least one frequency from the lower to the upper frequency band F1, F2. The combination according to the allocation system offers both the advantages of TDD in respect for example of adapting a traffic asymmetry, with easy channel estimation based on channel reciprocity and the advantages of an FDD system with clearly defined interference conditions.

A plurality of modifications is possible according to this basic system or based on it. FIG. 2 shows an instance by way of an example, wherein not every second time segment tf is used in the two frequency bands F1 or F2 in an alternating manner for TDD transmissions but a smaller number of time segments. In particular the allocation can be variable based on the current traffic conditions and utilization of the system. By way of an example FIG. 2 shows an allocation of the complete first time segment tf in the second frequency band F2 for TDD transmissions in the downlink, while the third time segment tf of the second frequency band F2 provides for a sub-division of the time segment tf into a first time sub-segment tf* for FDD transmissions and a second time sub-segment tf** for TDD transmissions in the downlink DL and the time period ts for transmission in the secondary transmission direction ug. In the first frequency band F1 for example only the fourth time segment tf is allocated for TDD transmissions in the uplink UL and only in a secondary manner in the downlink DL. During the first three time segments tf resources are allocated continuously for half-duplex FDD transmissions. With such allocation resources are allocated such that less capacity is made available for TDD traffic than for FDD traffic. Symmetry is however thereby maintained for TDD traffic. In particular a half-duplex FDD transmission takes place in one of the two frequency bands F1, F2, while TDD transmission takes place in the other of the frequency bands F2, F1. The complete orthogonality of each of the sub-frames, which are formed by the time segments tf, means that resources can be allocated according to TDD or FDD according to current traffic requirements. Where one of the time segments tf is subdivided into time sub-segments tf*, tf**, it is possible to adapt asymmetrical traffic requirements by adjusting the TDD frame duration, in that FDD transmission is scheduled into the part which is unused or currently not required for TDD.

FIG. 3 shows an example of a situation of two base stations BS, assigned to different operators OP1, OP2. Each of the base stations BS respectively has a first frequency band F1 and a second frequency band F2 or part thereof respectively with assigned frequency sub-bands f1, . . . , f5, f21, . . . , f25 for the first of the base stations BS and with frequency sub-bands f6, . . . f10, f26, . . . , f30 for the second of the base stations BS. The frequency guard band FG extends over the frequency sub-bands f11, . . . , f20 in this development of the method.

This allows completely independent scheduling of the allocation of resources even for base stations with a common location or overlapping radio cells, with synchronization only having to be ensured between the operators or their base stations. This is possible in a particularly simple manner if a permanent frame structure or time segment assignment is ensured in the context of synchronization.

FIG. 4 shows further modifications that are possible in combination or individually. Thus for example the available frequency range of the second frequency band F2 is extended for TDD transmissions during the first time segment tf, to include additional frequency sub-bands f9, f10. A further modification is shown with reference to the third time segment for the second frequency band F2. In this time segment tf not all the frequency sub-bands are allocated for TDD but one of the frequency sub-bands f11 is allocated for a half-duplex FDD transmission by the fourth mobile station MT4. Also in the second and fourth time segments respectively only some of the frequency sub-bands f3, f4 of the first frequency band F1 are allocated for TDD transmissions, while the other frequency sub-bands f2, f1 are allocated to the third and fourth mobile stations MT3, MT4 for half-duplex FDD transmissions. This allows an even more variable allocation of resources for TDD or FDD transmissions even within a single time segment tf, which could otherwise be used for TDD transmissions. It is possible to extend the frequency range, in particular into the frequency guard band FG, particularly in instances where the mobile stations communicating with different base stations BS are far away from each other and do not generate any significant reciprocal interference.

FIG. 4 further shows that it is also possible to relocate the frequency guard band FG within the available frequency range f. Thus in the temporally later time range, shown in the right-hand allocation system, the frequency guard band FG is for example relocated from the range of the middle frequency sub-bands f6, f7, f8, f9, f10 to lower frequency sub-bands f4, f5, f6, f7, f8. Correspondingly only the frequency sub-bands f1, f2, f3 are available to the first frequency band F1 for transmissions predominantly in the uplink UL, while the frequency sub-bands f9, f10, f1, f12, f13, f14, f15 are available to the second frequency band F2 for the allocation of resources for transmission predominantly in the downlink DL.

Generally therefore a procedure is proposed, with which half-duplex FDD and TDD are combined to give a total and integrated solution. With the approach of an integrated TDD plus FDD two asymmetrical TDD bands are incorporated into two in particular half-duplex FDD bands F1, F2 respectively, which guarantees that unfavorable interference states, such as base station to base station interference can be prevented for TDD, as known in a similar manner from FDD transmissions. Corresponding management of the lower and upper of the two FDD frequency bands F1, F2 will also allow adaptation to symmetrical and even asymmetrical traffic conditions for TDD.

The low transmission capacity in the counter transmission direction within each of the frequency bands means that the maximum loss of overall transmission capacity in the respective frequency band is kept very low. A loss of transmission capacity would only result, if solely FDD stations were to be supported, with the result that the short time periods ts for transmission in the secondary transmission direction ug remain completely unused.

Poor interference conditions cannot result for either FDD or TDD with such an approach. It allows independent scheduling of resources even for base stations with the same location but different operators or with different resource management facilities.

As TDD is preferably used for short-range transmissions, in other words interference states are less than for standard FDD systems, the TDD bandwidth can be extended to a certain degree. Long-term adaptation of the TDD asymmetry is also possible, by displacing the frequency guard band FG between the available frequency ranges of the lower and upper bands correspondingly, assuming the same overall bandwidth. Such a displacement of the frequency guard band FG takes place according to FIG. 4 in the transition from the left to right allocation system.

A multi-user half-duplex FDD approach is inherently assumed, wherein the half-duplex frequency bands are completely filled by appropriate time scheduling for every mobile station, such that all FDD data packets are received at the corresponding base station in a preferably perfect sequential sequence. It is preferable both for transmissions in the downlink DL and transmissions in the uplink UL for at least one narrow FDD band to be available in the form of the control channel c, which can be accessed by all mobile stations MT1, MT2, MT3, MT4 either for fast transmission back of for example ARQ messages, MIMO feedback information, etc. or for control information.

Down-sampling can also be provided for mobile stations close to a cell boundary or for fast-moving mobile stations. This lowers the bandwidth, such that the signal to noise ratio increases, with the guard interval being enlarged. As a result it is easy to adapt the physical radio channel.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for allocating resources to frequency bands of a radio communication system, comprising:
    allocating resources of first and second frequency division duplex frequency bands at a distance from each other for transmissions by a time division duplex transmission method;
    allocating the resources in the first frequency division duplex frequency band for frequency division duplex transmissions in an uplink and for time division duplex transmissions predominantly in the uplink as a primary transmission direction and in a secondary manner in a downlink as a secondary transmission direction; and
    allocating the resources in the second frequency division duplex frequency band for frequency division duplex transmissions in the downlink and for time division duplex transmissions predominantly in the downlink as the primary transmission direction and in a secondary manner in the uplink as the secondary transmission direction, with none of the resources being allocated for time periods of an allocation of the resources for one of the secondary transmission directions in the first and second frequency bands, for frequency division duplex transmissions in a counter secondary transmission direction to the secondary transmission direction.

2. The method as claimed in claim 1, wherein during the time periods of said allocating of the resources for one of the secondary transmission directions in the first and second frequency bands only the resources for time division duplex transmissions are allocated.

3. The method as claimed in claim 2, wherein said allocating of the resources for the secondary transmission direction is implemented in a synchronized manner taking into account all frequency sub-bands of the first and second frequency bands.

4. The method as claimed in claim 3, wherein frequency sub-bands of different base stations with overlapping transmit ranges and independent resource allocation are operated by operators thereof in a synchronized manner in respect of each other with regard to said allocating of the resources for the secondary transmission directions.

5. The method as claimed in claim 4, wherein for time division duplex transmissions in the secondary transmission direction only up to 10% of resources are allocated in temporal succession, compared with time division duplex transmissions in a counter primary transmission direction.

6. The method as claimed in claim 4, wherein for time division duplex transmissions in the secondary transmission direction only up to 20% of resources are allocated in temporal succession, compared with time division duplex transmissions in a counter primary transmission direction.

7. The method as claimed in claim 6, wherein one frequency sub-band in each of the first and second frequency bands is allocated as a frequency division duplex control channel.

8. The method as claimed in claim 7, wherein during a temporally simultaneous allocation of further frequency sub-bands for the secondary transmission direction according to time division duplex, the frequency division duplex control channel is either left unused as an idle gap or is allocated for a time division duplex transmission.

9. The method as claimed in claim 8, wherein in each of the first and second frequency division duplex frequency bands, the resources for time division duplex transmissions in the primary transmission direction are allocated for a first set of frequency sub-bands and a second set of different frequency sub-bands are allocated for frequency division duplex transmissions in an identical transmission direction for both time and frequency division duplex transmissions.

10. The method as claimed in claim 9, further comprising temporarily allocating the resources of a frequency guard band between the first and second frequency bands as additional frequency sub-bands for time division duplex transmissions.

11. The method as claimed in claim 10, wherein said temporarily allocating the frequency guard band between the first and second frequency bands includes temporarily allocating fewer sub-frequencies to the first frequency band than to the second frequency band.

12. The method as claimed in claim 11, wherein a time sub-segment for the frequency division duplex transmissions, a time sub-segment for the time division duplex transmissions in the primary transmission direction and a period for time division duplex transmissions in the secondary transmission direction are allocated within one time segment.

13. The method as claimed in claim 12, wherein the frequency division duplex transmissions are allocated for half-duplex frequency division duplex transmissions.

14. A user station for time division duplex operation in a radio communication system, comprising means for using the resources allocated according to the method recited in claim 13.

15. A user station for time division duplex operation in a radio communication system, comprising means for using the resources allocated according to the method recited in claim 12.

16. A user station for time division duplex operation in a radio communication system, comprising means for using the resources allocated according to the method recited in claim 11.

17. A user station for time division duplex operation in a radio communication system, comprising means for using the resources allocated according to the method recited in claim 10.

18. A user station for time division duplex operation in a radio communication system, comprising means for using the resources allocated according to the method recited in claim 9.

19. A user station for time division duplex operation in a radio communication system, comprising means for using the resources allocated according to the method recited in claim 8.

20. A user station for time division duplex operation in a radio communication system, comprising means for using the resources allocated according to the method recited in claim 7.

21. A user station for time division duplex operation in a radio communication system, comprising means for using the resources allocated according to the method recited in claim 6.

22. A user station for time division duplex operation in a radio communication system, comprising means for using the resources allocated according to the method recited in claim 4.

23. A user station for time division duplex operation in a radio communication system, comprising means for using the resources allocated according to the method recited in claim 3.

24. A user station for time division duplex operation in a radio communication system, comprising means for using the resources allocated according to the method recited in claim 2.

25. A user station for time division duplex operation in a radio communication system, comprising means for using the resources allocated according to the method recited in claim 1.

26. A network device with a control facility for allocating resources in a radio communication system, comprising:
means for allocating resources of first and second frequency division duplex frequency bands at a distance from each other for transmissions by a time division duplex transmission method;
means for allocating the resources in the first frequency division duplex frequency band for frequency division duplex transmissions in an uplink and for time division duplex transmissions predominantly in the uplink as a primary transmission direction and in a secondary manner in a downlink as a secondary transmission direction; and
means for allocating the resources in the second frequency division duplex frequency band for frequency division duplex transmissions in the downlink and for time division duplex transmissions predominantly in the downlink as the primary transmission direction and in a secondary manner in the uplink as the secondary transmission direction, with none of the resources being allocated for time periods of an allocation of the resources for one of the secondary transmission directions in the first and second frequency bands, for frequency division duplex transmissions in a counter secondary transmission direction to the secondary transmission direction.

27. The network device as claimed in claim 26, wherein during the time periods of the allocating of the resources for one of the secondary transmission directions in the first and second frequency bands only the resources for time division duplex transmissions are allocated.

28. The network device as claimed in claim 27, wherein said means for allocating of the resources for the secondary transmission direction is implemented in a synchronized manner taking into account all frequency sub-bands of the first and second frequency bands.

29. The network device as claimed in claim 28, wherein frequency sub-bands of different base stations with overlapping transmit ranges and independent resource allocation are operated by operators thereof in a synchronized manner in respect of each other with regard to the allocating of the resources for the secondary transmission directions.

30. The network device as claimed in claim 29, wherein for time division duplex transmissions in the secondary transmission direction only up to 10% of resources are allocated in temporal succession, compared with time division duplex transmissions in a counter primary transmission direction.

31. The network device as claimed in claim 29, wherein for time division duplex transmissions in the secondary transmission direction only up to 20% of resources are allocated in temporal succession, compared with time division duplex transmissions in a counter primary transmission direction.

32. The network device as claimed in claim 31, wherein one frequency sub-band in each of the first and second frequency bands is allocated as a frequency division duplex control channel.

33. The network device as claimed in claim 32, wherein during a temporally simultaneous allocation of further frequency sub-bands for the secondary transmission direction according to time division duplex, the frequency division duplex control channel is either left unused as an idle gap or is allocated for a time division duplex transmission.

34. The network device as claimed in claim 33, wherein in each of the first and second frequency division duplex frequency bands, the resources for time division duplex transmissions in the primary transmission direction are allocated for a first set of frequency sub-bands and a second set of different frequency sub-bands are allocated for frequency division duplex transmissions in an identical transmission direction for both time and frequency division duplex transmissions.

35. The network device as claimed in claim 34, further comprising means for temporarily allocating the resources of a frequency guard band between the first and second frequency bands as additional frequency sub-bands for time division duplex transmissions.

36. The network device as claimed in claim 35, wherein said means for temporarily allocating the frequency guard band between the first and second frequency bands includes temporarily allocating fewer sub-frequencies to the first frequency band than to the second frequency band.

37. The network device as claimed in claim 36, wherein a time sub-segment for the frequency division duplex transmissions, a time sub-segment for the time division duplex transmissions in the primary transmission direction and a period for time division duplex transmissions in the secondary transmission direction are allocated within one time segment.

38. The network device as claimed in claim 37, wherein the frequency division duplex transmissions are allocated for half-duplex frequency division duplex transmissions.

39. A radio communication system for allocating resources to frequency bands of a radio communication system, comprising:
   a network device allocating resources of first and second frequency division duplex frequency bands at a distance from each other for transmissions by a time division duplex transmission method, allocating the resources in the first frequency division duplex frequency band for frequency division duplex transmissions in an uplink and for time division duplex transmissions predominantly in the uplink as a primary transmission direction and in a secondary manner in a downlink as a secondary transmission direction, and allocating the resources in the second frequency division duplex frequency band for frequency division duplex transmissions in the downlink and for time division duplex transmissions predominantly in the downlink as the primary transmission direction and in a secondary manner in the uplink as the secondary transmission direction, with none of the resources being allocated for time periods of an allocation of the resources for one of the secondary transmission directions in the first and second frequency bands, for frequency division duplex transmissions in a counter secondary transmission direction to the secondary transmission direction; and
   a user station communicating via time division duplex using the resources allocated by the network device.

* * * * *